WAVE LENGTH

WAVE NUMBER (cm⁻¹)

March 21, 1972    MATAZO ABE    3,651,220
RUGULOVASINE

Filed April 17, 1969    3 Sheets-Sheet 3

MATAZO ABE    Inventor

By, Wenderoth, Lind & Ponack
Attorneys

3,651,220
RUGULOVASINE
Matazo Abe, Tokyo, Japan, assignor to Takeda Chemical Industries, Ltd., Osaka, Japan
Filed Apr. 17, 1969, Ser. No. 818,469
Claims priority, application Japan, Apr. 17, 1968, 43/25,687
Int. Cl. A61k 21/00
U.S. Cl. 424—122          10 Claims

ABSTRACT OF THE DISCLOSURE

Rugulovasine A and B, metabolites of Penicillium, Corticium, Pellicularia or Lenzites microorganisms, are hypotensor-active substances, useful in the treatment of high blood pressure. They are also useful in the treatment of bradycardia.

---

Figure 1:
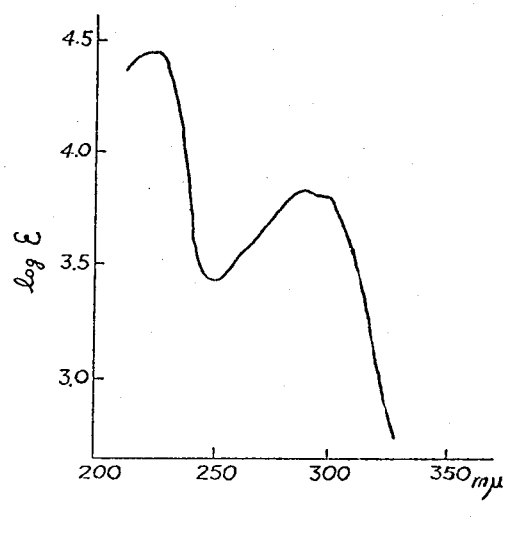

This invention relates to hypotensor-active substances, rugulovasine A and B, and to the production thereof.

According to the present invention:
(1) certain microorganisms are capable of producing novel hypotensor-active substances;
(2) the said microorganisms belong to the genus Penicillium, the genus Corticium, the genus Pellicularia or the genus Lenzites;
(3) the hypotensor-active substances are accumulated in a culture broth in which the microorganisms are cultured; and
(4) so-accumulated substances can be recovered in a desired purity from the culture broth by per se conventional means.

The novel substances have been designated as rugulovasine A and B and will be hereinafter referred to as such in the present specification (or generally referred to merely as rugulovasine).

The main object of the present invention is the embodiment of rugulovasine.

Another object of the present invention is to provide a method for producing rugulovasine.

These objects are realized by incubating a rugulovasine-producing microorganism of the genus Penicillium, the genus Corticium, the genus Pellicularia or the genus Lenzites in a medium containing assimilable carbon sources, digestible nitrogen sources and other nutrients so as to cause the microorganism to accumulate rugulovasine A and/or B in the culture broth, and recovering the same therefrom.

The present invention makes use of a microorganism capable of producing at least rugulovasine A or B and belonging to the genus Penicillium, the genus Corticium, the genus Pellicularia or the genus Lenzites, including variants and mutants thereof.

While there is a large number of such microorganisms, the following microorganisms are some typical strains, and have been deposited at American Type Culture Collection, Rockville, Maryland, and in the Institute for Fermentation, Osaka, Japan, under the accession numbers set forth in parentheses, infra.

(Typical microorganisms):

*Penicillium rugulosum* (ATCC 20201)
*Penicillium concavo-rugulosum* No. 6 (ATCC 20202)
*Penicillium concavo-rugulosum* U6-13 (IFO 9135)
*Penicillium concavo-rugulosum* Mm-10 (IFO 9136)
*Penicillium corylophiloides* (ATCC 20203)
*Penicillium purpurogenum* (ATCC 20204)
*Corticium caeruleum* (ATCC 20205)
*Pellicularia filamentosa* (ATCC 20206)
*Lenzites trabea* (ATCC 20207)

The microbiological properties of these strains are not generally fixed and there are many mutants and variants of the rugulovasine-producing microorganisms.

Among these organisms, regardless of whether the variation is caused naturally or artificially, for example, with X-ray, ultraviolet-ray or by the action of chemical reagents such as nitrogen mustard, any one can be employed in the method of the present invention, as long as it produces rugulovasine A and/or B.

The composition of the medium is optional, provided only that the rugulovasine-producing microorganism can grow thereon. Thus, it can contain, as carbon sources, sugars such as glucose, sucrose, maltose, etc., sugar alcohols such as mannitol, sorbitol, dulcitol, glycerine, etc., and organic acids such as succinic acid, citric acid, etc.; as nitrogen sources, peptone, amino acids such as aspartic acid, glutamic acid, etc., the ammonium salts of organic acids such as ammonium succinate, ammonium citrate, etc.

Such inorganic salts as various phosphates, magnesium sulfate and sodium chloride can also be incorporated into the medium.

In addition, for the purpose of promoting the growth of the microorganisms, various vitamins as well as nucleic acids and their related compounds can be added. A medium containing ingredients other than those mentioned above can be employed as well, unless the growth of the microorganism and the accumulation of the end product are thereby adversely affected.

The cultural conditions, such as the composition of the medium, incubation temperature, the period of the cultivation, etc., are chosen and controlled so as to attain a maximal yield of the desired product and, generally speaking, when a surface cultural method involving the use of a liquid medium is employed, the pH of the medium is about 4.0 to about 7.5, advantageously about 5.0 to about 6.5 and the incubation temperature is about 20° to about 35° C., advantageously about 26° to about 30° C., and a cultivation period of about 10 to 20 days is adequate. Where cultivation is carried out under aeration and agitation, a pH of 5.0 to 7.0, a temperature of 20° to 35° C. and a duration of 4 to 10 days are appropriate.

Since the optimum conditions depend upon the type of medium, the strain of organism and other factors, the conditions should be selected with due regard to such factors.

The culture broth obtained by cultivation of a rugulovasine-producing microorganism belonging to the genus Penincillium, the genus Corticium, the genus Pellicularia or the genus Lenzites not only contains substantial amounts of rugulovasine A and/or B but also contains small amounts of the hitherto known ergo-alkaloids such as chanoclavine, festuclavine, agroclavine and the like. These alkaloids occur not only in the liquid phase of the broth but also in the microbial cells, and in order to recover the product rugulovasine A and/or B, it is advantageous to collect the total alkaloids in the first place through the application of a per se conventional alkaloid extraction method.

According to the present invention, the products rugulovasine A and/or B are then isolated and recovered from the total alkaloids, and where both rugulovasine A and B have been produced, they can be recovered independently or as a mixture thereof.

It is possible, first, to recover the two products as a mixture and then to separate them from one another. To recover rugulovasine A and B either independently or as a mixture, use can be made of any per se conventional procedure for separating two or more chemically related substances into several fractions. Such operation can be performed by taking advantage of the physicochemical properties of the end products, for example, such as the difference in solubility between the end product and impurity, the difference in adsorption affinity therebetween, the difference in the rate of distribution between two liquid phases, the relative ease of separation from a solution, sedimentation with acids and the like.

There is also the possibility of recovering other alkaloids, inclusive of chanoclavine, festuclavine, etc., which also occur in the broth, along with the end products of the present invention in the same manner as mentioned above.

By using a suitable combination of the aforementioned means, rugulovasine can be isolated from the culture broth in a crystalline form. Physical and chemical properties of rugulovasine obtained in the manner as detailed in Example 1 are as follows:

PHYSICOCHEMICAL PROPERTIES

Rugulovasine A (1) Rugulovasine A is crystallized from benzene, chloroform or acetonitrile in colorless prisms or needles melting at 138° C. (decomposition);

(2) Its molecular weight is about 268;

(3) Its elementary analytical values are C, 72.84%, H, 5.76% and N, 9.99%.

Figure 4:
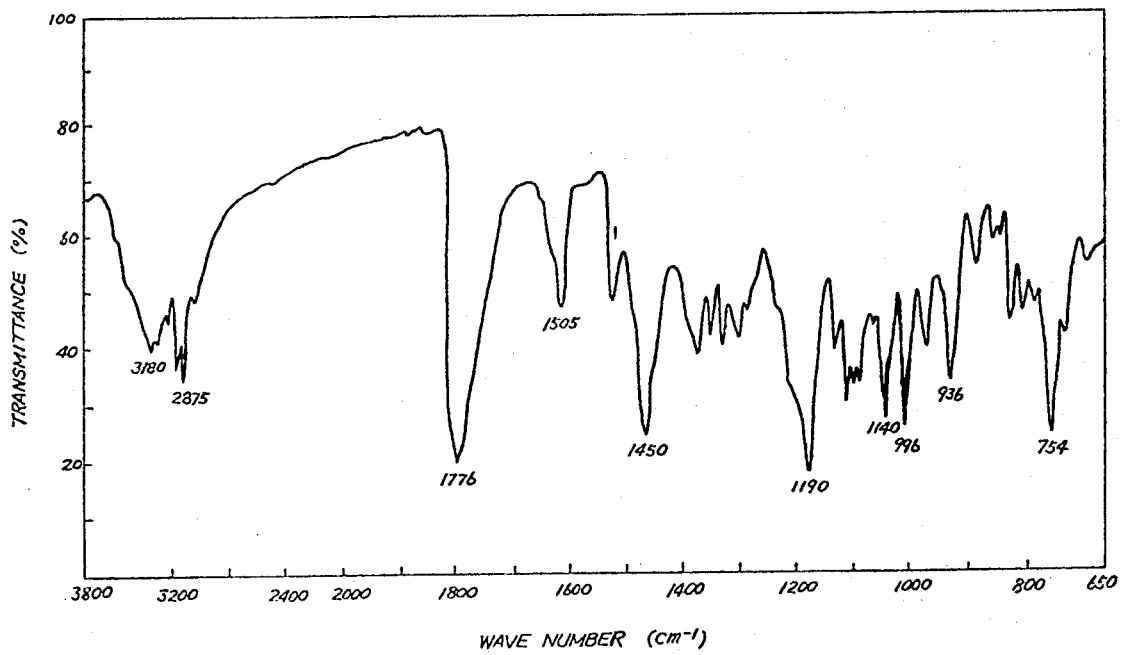

(4) It shows $[\alpha]_D^{22}=0°$ in pyridine; its dihydro derivative shows specific rotations $[\alpha]_{436}^{22}=-2.2°$ $[\alpha]_{546}^{22}=-1.3°$ $[\alpha]_{578}^{22}=-1.5°$ $([\alpha]_{Hg}^{22})$ molecular formula $C_{16}H_{18}N_2O_2$, M.P. 149°–151° C., and infrared absorptions as shown in FIG. 4;

(5) It is sparingly soluble in petroleum ether, moderately soluble in ether, chloroform, benzene and acetonitrile, but readily soluble in ethyl acetate, acetone, methanol, ethanol and pyridine. It exhibits almost no fluorescence in any organic solvent. It dissolves sparingly in water but is readily soluble in dilute acids;

(6) It shows the following color reactions:

Isonitrile reaction ------------------------------- —
Dragendorff's reaction --------------------------- +
Ehrlich's reaction ------------------------------- ++
Legal's reaction --------------------------------- +
Ferric hydroxamate reaction --------------------- +
Fehling's reaction ------------------------------- —
2,4-dinitrohydrazone reaction ------------------- —
Ferric chloride reaction ------------------------- —
Decoloration of potassium permanganate --------- +

Figure 2:
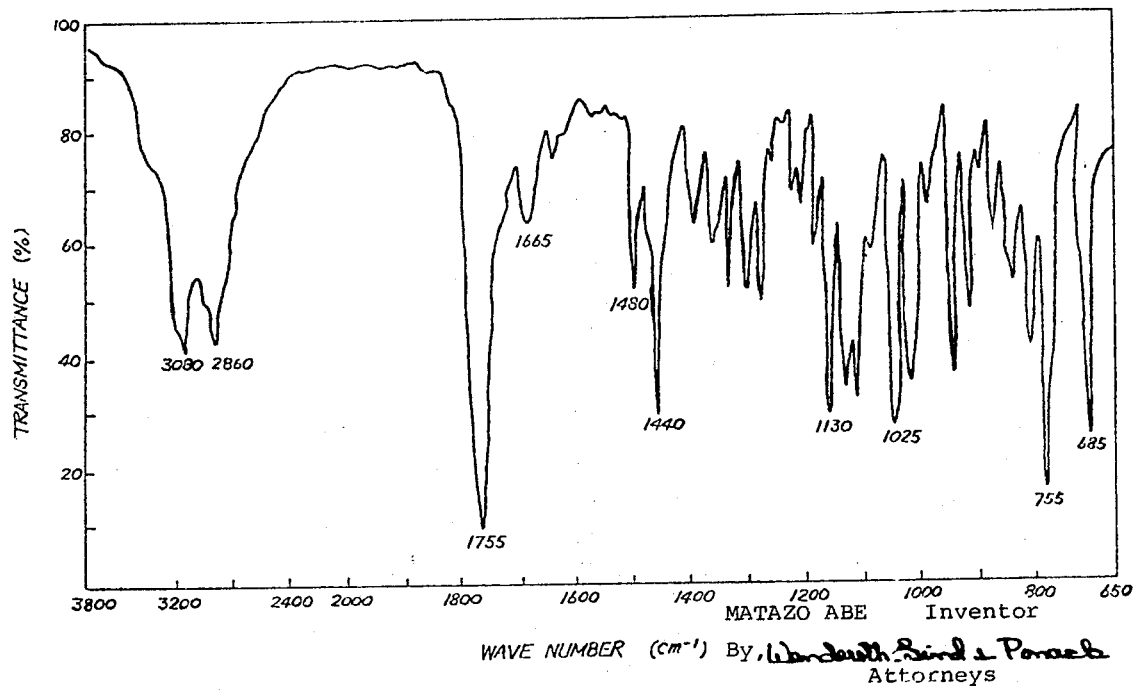

(7) It shows ultraviolet absorptions at the wave lengths in millimicrons of 224, 277, 288 and 295 (FIG. 1);

(8) Its crystals show significant infrared adsorption bands in KBr disc at the wave numbers: 685, 755, 1025, 1130, 1440, 1480, 1665 and 1755 cm.$^{-1}$ (FIG. 2);

(9) It gives hydrochloride, $C_{16}H_{16}O_2N_2 \cdot HCl$, elementary analytical values C, 62.80%; H, 5.61%; N, 9.17%; Cl, 11.43%; colorless prisms from water, M.P. 225° C. (decomp.), $[\alpha]_D^{22}=0°$.

$[\alpha]_{436}^{22}=-3.0°$, $[\alpha]_{546}^{22}=-2.0°$, $[\alpha]_{578}^{22}=-1.0°$ (in pyridine) the oxalate, $C_{16}H_{16}O_2N_2 \cdot C_2H_2O_4$, colorless needles from water, M.P. 224° C. (decomp.), $[\alpha]_D^{22}=0°$ (in pyridine); the picrate, $C_{16}H_{16}O_2N_2 \cdot C_6H_3O_7N_3$, yellow massive prisms from methanol, M.P. 229° C. (decomp.), $[\alpha]_D^{22}=0°$ (in pyridine); and dihydro rugulovasine A, $C_{16}H_{18}N_2O_2$

M.P. 149–151° C.

$[\alpha]_{436}^{22}=-2.2°$ $[\alpha]_{546}^{22}=-1.3°$ $[\alpha]_{578}^{22}=-1.5°$ $([\alpha]_{Hg}^{22})$ and infrared absorptions as shown in FIG. 4.

Figure 3:
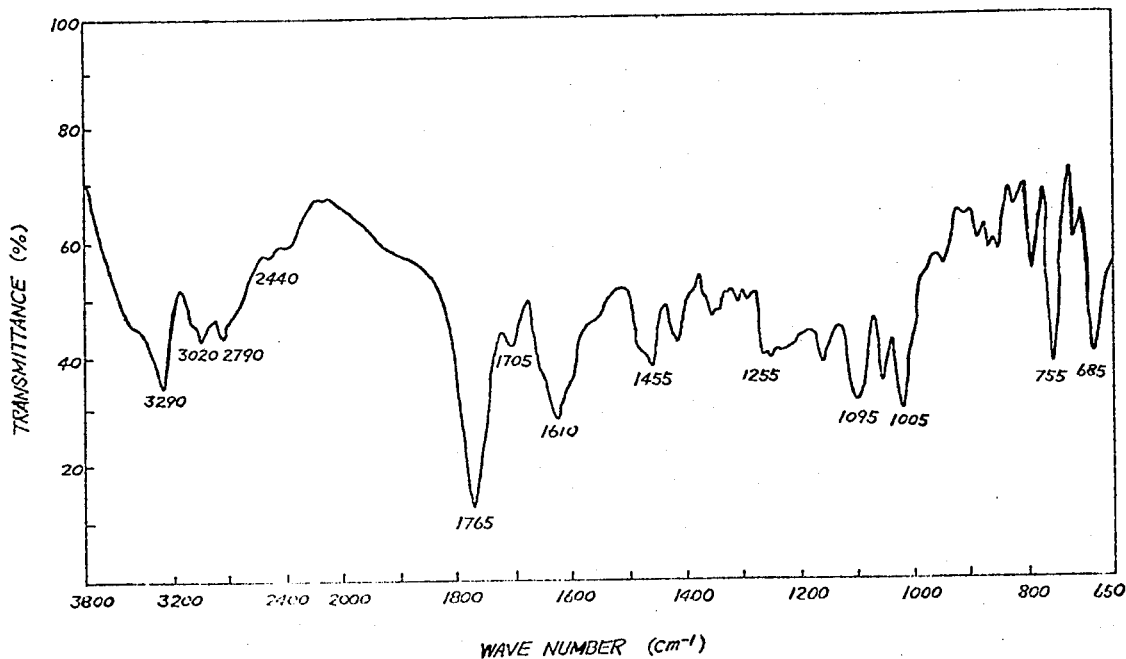

Rugulovasine B (1) Rugulovasine B is a colorless resinous oily substance, hardly crystallized from ordinary solvents;

(2) Its molecular weight is about 268;

(3) The elementary analytical values of its oxalate are C, 63.40%; H, 5.51%; and N, 8.30%;

(4) It shows $[\alpha]_D^{22}=0°$ in pyridine, but its dihydro derivative shows specific rotations $([\alpha]_{Hg}^{22})$ $[\alpha]_{546}^{22}=+0.9°$, $[\alpha]_{578}^{22}=+0.5°$ (5) It is sparingly soluble in petroleum ether, moderately soluble in ether, benzene and chloroform, but is readily soluble in many other solvents. As in the case of rugulovasine A, its solutions in organic solvents exhibit almost no fluorescence. It is sparingly soluble in cold water, but readily soluble in dilute acids. Like rugulovasine A, it yields crystalline salts on neutralization with acids;

(6) It shows the same color reactions as rugulovasine A;

(7) It shows ultraviolet absorptions at the wave lengths in millimicrons at 227, 278, 288 and 295;

(8) The crystals of its oxalate show significant infrared absorption bands in KBr disc at the wave numbers: 685, 755, 1005, 1095, 1255, 1455, 1610, 1705, 1765, 2440, 2790, 3020 and 3290 cm.$^{-1}$ (FIG. 3);

(9) Its hydrochloride is crystallized from water in white prisms, M.P. 187° C. (decomp.), $[\alpha]_D^{22}=0°$, $[\alpha]_{436}^{22}=+1.4°$, $[\alpha]_{546}^{22}=+0.5°$, $[\alpha]_{578}^{22}=0°$ (in pyridine); molecular weight about 305 (by mass spectroscopy); elementary analytical values calculated for $C_{16}H_{16}O_2N_2 \cdot HCl \cdot H_2O$ (percent): C, 59.53; H, 5.93; N, 8.68; Cl, 10.99. Found (percent): C, 59.12. H, 5.99; N, 8.63; Cl, 11.43;

(10) Dihydro rugulovasine B has a molecular formula of $C_{16}H_{18}N_2O_2$, melting at 190–193° C. (decomp.)

Figure 5:
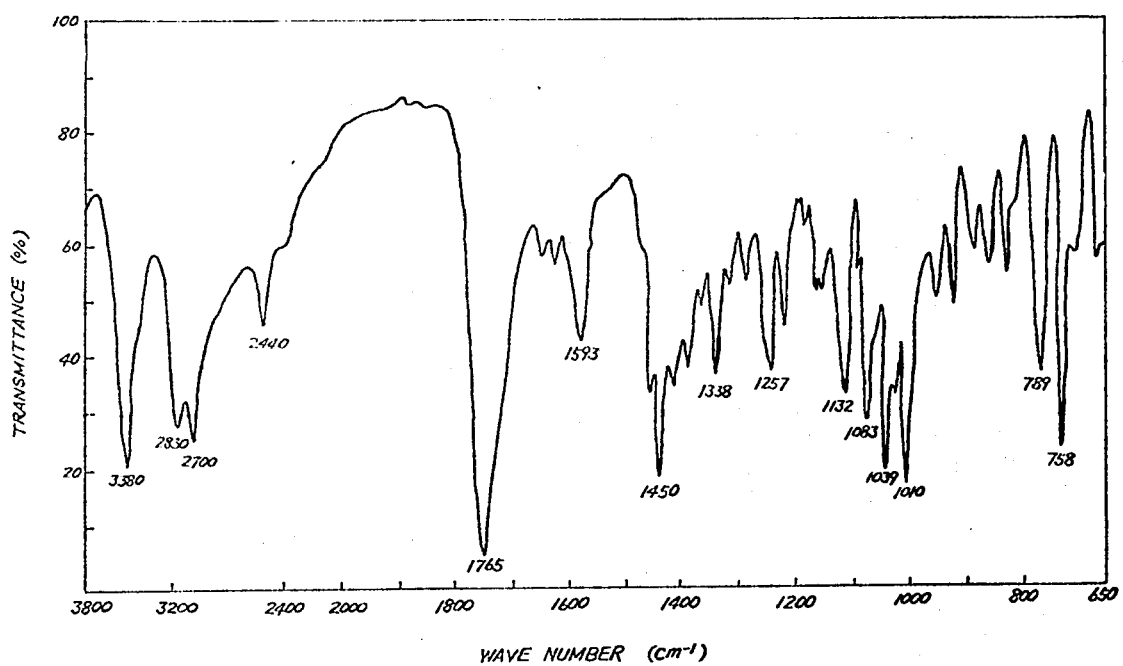

$[\alpha]_{436}^{22}=+2.3°$, $[\alpha]_{546}^{22}=+0.9°$, $[\alpha]_{578}^{22}=+0.5°$ $([\alpha]_{Hg}^{22})$ its infrared absorption spectrum being shown in FIG. 5.

Rugulovasine A and B have in common the molecular formula of $C_{16}H_{16}O_2N_2$ and are compounds which under certain conditions are inter-convertible.

In a test conducted to prove this fact, each of the two substances was dissolved in a solvent and, after heating at the boiling point of the solution for 5 minutes, subjected to thin-layer chromatography, followed by development with a solution of para-dimethylaminobenzaldehyde in dilute hydrochloric acid.

The colored spots corresponding to rugulovasine A and B were colorimetrically analyzed with the use of a densitometer. The results of the above test are summarized as follows:

| Solvent used | Conversion rate, from rugulovasine A to B, percent | Conversion rate, from rugulovasine B to A, percent |
|---|---|---|
| Ethanol | 50 | 12 |
| Benzene | 17 | 6 |
| Ethyl acetate | 30 | 0.1 |

The thin-layer chromatograms of the two substances developed with several solvent systems have given the following $R_f$ values, which distinguish them from any known alkaloid derived from Claviceps and various molds.

| Developer solvent systems* | (I) | (II) | (III) |
|---|---|---|---|
| Rugulovasine A | 0.46 | 0.56 | 0.64 |
| Rugulovasine B | 0.55 | 0.56 | 0.64 |

*Developers:
(I) chloroform-ethanol (10:1.5).
(II) chloroform-diethylamine (10:1).
(III) benzene-methanol (2:1).

Physiological activities of rugulovasine (1) Hypotensive and bradycardic actions of rugulovasine A and B in the anesthetized cat.

| Drug | Dose (mg./kg. body) | No. animals | Peak effect (percent decrease) | Time of peak effect (min.) | Duration of action (min.) |
|---|---|---|---|---|---|
| Hypotensive action | | | | | |
| Rugulovasine A | 0.05 | 3 | 20 | 14 | 60 |
|  | 0.10 | 3 | 54 | 2 | 170 |
| Rugulovasine B | 1.0 | 6 | 21 | 150 | >240 |
|  | 2.0 | 4 | 44 | 120 | >300 |
| Bradycardic action | | | | | |
| Rugulovasine A | 0.05 | 3 | 14 | 15 | 60 |
|  | 0.10 | 3 | 28 | 5 | >170 |
| Rugulovasine B | 1.0 | 6 | 11 | 60 | >240 |
|  | 2.0 | 4 | 33 | 120 | >300 |

NOTE.—Administration was made intravenously.

(2) Hypotensive action of rugulovasine A and B in the spontaneously hypertensive rat.

| Drug | Dose (mg./kg.) | Route | No. rats | Peak effect (mm. Hg) | Time of peak effect (hr.) | Duration of action (hr.) |
|---|---|---|---|---|---|---|
| Rugulovasine A | 5 | S.C.* | 5 | 25 | 1 | 7 |
|  | 10 | P.O.* | 4 | 21 | 7 | 7-24 |
| Rugulovasine B | 10 | S.C. | 4 | 17 | 4 | 7-24 |
|  | 20 | S.C. | 4 | 20 | 3 | 24 |
|  | 10 | P.O. | 7 | 17 | 3 | 7-24 |

*S.C.: subcutaneous administration; P.O.: per os administration.

NOTE.—Initial control blood pressure in each group was 180-195 mm. Hg.

(3) Acute toxicity:
Lethal Dose ($LD_{50}$) of rugulovasine A and B was examined against groups of mice each consisting of three heads, and the results are shown below, on average.

|  | Intravenous, mg./kg. | Intraperitoneal, mg./kg. |
|---|---|---|
| Rugulovasine A-HCl | 80 |  |
| Rugulovasine B-HCl | 70 | 150 |

The mice were killed within 2 minutes by intravenous administration and within 30 minutes in case of intraperitoneal administration.

Effective dose of rugulovasine A in the treatment of elevated blood pressure (i.e. as a hypotensor) in the mammal is between about 0.2 to about 0.5 mg./patient by intravenous administration and between about 1.0 to about 2.0 mg./patient in case of per os administration. The same effective dosages are used in the treatment of bradycardia (i.e. abnormal slowness of the heartbeat, e.g. pulse rate of 60 or less) in the mammal.

On the other hand, rugulovasine B is safely administered in a dose of about ten times as much as that of rugulovasine A in each case.

Presently-preferred embodiments of the invention are shown in the following examples, but these are not intended to be construed as limitation of the present invention.

Throughout the specification, the abbreviations "ml.," "mg.," "m$\mu$" and "° C." mean milliliter(s), milligram(s), millimicron(s) and degree(s) centigrade, respectively.

Percentages are calculated on the weight per volume basis. In the following examples, parts by weight bear the same relation to parts by volume as do gram(s) to milliliter(s).

EXAMPLE 1

A tap water solution of mannitol (10%), glucose (4%), succinic acid (1%), $KH_2PO_4$ (0.1%), $MgSO_4 \cdot 7H_2O$ (0.03%) and corn steep liquor (0.2%) is adjusted to pH 5.6 with aqueous ammonia, and 1000 parts by volume of the solution is poured into a fermenter (its capacity being 2000 parts by volume), and is then sterilized. The medium is inoculated with *Penicillium concavo-rugulosum* No. 6 (ATCC 20202) and incubated under standing conditions at 28°–30° C. for 15 days. After cultivation is completed, the mycelia separated from the broth by filtration are mixed with 200 parts by volume of 0.1 N sulfuric acid solution so that the alkaloids contained in the mycelia are extracted. This extract solution is combined with the broth filtrate, and the combined solution is made alkaline with aqueous ammonia to pH 10 or higher, followed by repeated extraction each with 400 parts by volume of ethyl acetate. Then, the combined organic solvent portion is concentrated to dryness under reduced pressure and is dissolved in about 10 parts by volume of a 1% aqueous solution of phosphoric acid. After being adjusted to pH 6.0 with 0.1 N NaOH, the solution is mixed with 7 parts by volume of chloroform. By this operation rugulovasine A and/or B are transferred to the chloroform layer, while chanoclavine and trace alkaloids remain in the aqueous solution. The chloroform layer is concentrated to a suitable quantity, and the concentrate is subjected to a simple counter-current extraction using a phosphoric acid buffer solution (pH 4.0) and 10 separatory funnels. It will now be found that the chloroform phases in the funnels contain rugulovasine B. So all the chloroform fractions are pooled.

The buffer portions in the separatory funnels are divided into three fractions.

That is to say, the fraction corresponding to the 1st to 5th funnels which contain for the most part rugulovasine A, the fraction corresponding to the 8th to 10th funnels which contain for the most part rugulovasine B, and the fraction corresponding to the 6th and 7th funnels which contain both rugulovasine A and B in nearly equal proportions.

The fraction containing both A and B is subjected to counter current extraction a second time to separate the two alkaloids from each other in the above mentioned manner.

About 3 parts by volume of the rugulovasine A rich fraction (corresponding to contents in the funnels No. 1 to 5) is adjusted to pH 10 with 0.1 N NaOH and mixed with about 4 parts by volume of ethyl acetate until the desired product is completely transferred to the ethyl acetate layer. This ethyl acetate solution is dehydrated over anhydrous sodium sulfate and concentrated to dryness. The residue is dissolved in about 5 parts by volume of hot benzene and the solution is allowed to stand at room temperature, whereupon crude crystals or rugulovasine A separate out. The yield is 0.48 part by weight.

The crude crystals are repeatedly recrystallized from benzene to obtain colorless needles which decompose at 138° C. This product gives the following chemical composition, which coincides with the molecular formula of $C_{16}H_{16}O_2N_2$ and shows no rotatory polarization in pyridine.

Calculated for $C_{16}H_{16}O_2N_2$ (percent): C, 71.62; H, 6.01; N, 10.44. Found (percent): C, 72.84; H, 5.76; N, 9.99.

On the other hand, the chloroform and buffer fractions rich in rugulovasine B are treated as follows. The chloroform fraction is concentrated to a suitable quantity, while the buffer fraction is adjusted to pH 10 with 0.1 N NaOH and repeatedly extracted each with 0.5 part by volume of ethyl acetate, whereby the rugulovasine B is completely transferred to the ethyl acetate. The ethyl acetate layer is dehydrated over anhydrous sodium sulfate and concentrated to dryness.

The residue is dissolved in a suitable amount of 0.1 N-sulfuric acid, and the resulting solution is combined with the concentrated chloroform solution obtained above. The combined solution is vigorously stirred so that the rugulovasine B contained in the chloroform is extracted into the acid solution. This acid solution is adjusted again to pH 10 with 0.1 N NaOH and repeatedly extracted each with 2 parts by volume of ethyl acetate, whereby the rugulovasine B is transferred to the ethyl acetate. The ethyl acetate layer is dehydrated over anhydrous sodium sulfate and concentrated to dryness whereupon the rugulovasine B is obtained as a crude syrup. The yield is 0.32 part by weight. This product is dissolved in a small amount of ethanol, heated after the addition of 0.5 part by volume of a 5% aqueous solution of oxalic acid and then the solution is allowed to stand at room temperature, whereupon 0.27 part by weight of the crude oxalate is obtained as a whitish mass of crystals.

Those crude crystals are recrystallized from hot water to obtain colorless pillar-shaped crystals of rugulovasine B oxalate which decompose at 217° C.

This product has the following chemical composition which coincides with the molecular formula of

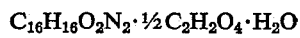

$$C_{16}H_{16}O_2N_2 \cdot \tfrac{1}{2}C_2H_2O_4 \cdot H_2O$$

Calculated (percent): C, 65.16; H, 5.47; N, 8.94. Found (percent): C, 63.40; H, 5.51; N, 8.30.

Like regulovasine A, this product shows no rotatory polarization, either.

From the aqueous solution which has remained after the extraction of rugulovasine A and B with chloroform from the aforementioned total alkaloid solution, pillar-shaped crystals of chanoclavine can be recovered by per se conventional procedure.

EXAMPLE 2

In the same manner as in Example 1, the following microorganisms are cultivated to give the yields as shown below.

Microorganism: Total alkaloid production mg./liter
  Penicillium rugulosum (ATCC 20201) ----- 23.0
  Lenzites trabea (ATCC 20207) ------------ 2.5

EXAMPLE 3

A tap water solution containing sorbitol (6%), glucose (4%), succinic acid (1%), $KH_2PO_4$ (0.1%), $MgSO_4 \cdot 7H_2O$ (0.03%) and corn steep liquor (0.2%) is adjusted to pH 5.6 with aqueous ammonia, and 30,000 parts by volume of this medium is inoculated with 1,500 parts by volume of a seed culture of a mutant strain (U6–13 IFO 9135), induced by ultraviolet irradiation from Penicillium concavo-rugulosum No. 6 (ATCC 20202).

This seed culture has been prepared by cultivating the mutant in a medium of the same composition as described above at 28° C. for 3 days. The main cultivation is conducted at a temperature of 28°–30° C. under constant aeration and agitation. On the fifth day of cultivation, the broth is treated in the same manner as in Example 1 to recover 2.3 parts by weight of rugulovasine A and 1.8 parts by weight of rugulovasine B.

EXAMPLE 4

A tap water solution containing mannitol (3%), glucose (2%), succinic acid (1%), $KH_2PO_4$ (0.1%), $MgSO_4 \cdot 7H_2O$ (0.03%) and peptone (0.3%) is adjusted to pH 6.0 with aqueous ammonia, and 50,000 parts by volume of the solution is put in a fermentor (its capacity being 100,000 parts by volume). After being sterilized, the medium is inoculated with Corticium caeruleum (ATCC 20205) and subjected to surface culture at 28° C. for 14 days.

Thereafter, the broth is treated in the same manner as in Example 1 to recover 0.5 part by weight of rugulovasine A and 0.3 part by weight of rugulovasine B.

EXAMPLE 5

In the same medium as in Example 4, Pellicularia filamentosa (ATCC 20206) is incubated under stirring conditions at 30° C. for 12 days.

About 50,000 parts by volume of the resulting broth is treated in the same manner as in Example 1 to recover 0.25 part by weight of rugulovasine A and 0.1 part by weight of rugulovasine B.

EXAMPLE 6

About 30,000 parts by volume of tap water solution containing glucose (2%), sucrose (2%), ammonium chloride (0.15%), urea (0.05%), $KH_2PO_4$ (0.1%), $MgSO_4 \cdot 7H_2O$ (0.05%), $FeSO_4 \cdot 7H_2O$ (0.01%), biotin (10γ/liter) and vitamin $B_1$ hydrochloride (1 mg./liter) is poured into a fermenter (its capacity being 120,000 parts by volume) and is sterilized.

The medium is inoculated with Lenzites trabea (ATCC 20207) and incubated at 24° C. for 7 days under constant aeration and agitation.

The resulting broth is treated in the same manner as in Example 1 to recover 0.11 part by weight of rugulovasine A and 0.3 part by weight of rugulovasine B.

EXAMPLE 7

Penicillium concavo-rugulosum Mm–10 (IFO 9136), a mutant strain derived from Penicillium concavo-rugulosum No. 6 (ATCC 20202) by ultraviolet irradiation, is incubated in a series of enlarging scales as shown below.

(1) Slant culture

Medium: Percent
  Potato dextrose ---------------------------- 3.9
  Yeast extract ------------------------------ 1.0
  Casamino acids ---------------------------- 1.0
  Agar -------------------------------------- 2.0
  pH 5.6.

Conditions.—Incubation at 28° C. for 72 to 96 hours.

(2) Seed culture

Medium: Percent
  Mannitol ---------------------------------- 3.0
  Glucose ----------------------------------- 1.0
  Succinic acid ----------------------------- 1.0
  Corn steep liquor ------------------------- 0.2
  $KH_2PO_4$ ------------------------------- 0.1
  $MgSO_4 \cdot 7H_2O$ --------------------- 0.03
  Tap water.
  pH 5.6.

Conditions.—500 ml./2 liter flask, two flasks, incubation at 28° C. under stirring of 150 rotation per minute for 48 hours.

(3) Main culture

Medium.—The same as the seed medium.

Conditions.—100 liters/300 liter tank. The incubation was carried at 28° C. under aeration and agitation for 126 hours.

Thus-obtained culture broth is subjected to the procedure as in Example 1 to give 5 g. of rugulovasine A and 3.3 g. of rugulovasine B.

What is claimed is:
1. Rugulovasine A characterized by the following properties:
   (1) it forms colorless prisms or needles melting at 138° C. (decomposition);
   (2) its molecular weight is about 268;
   (3) its elementary analytical values are C, 72.84%; H, 5.76%, and N, 9.99%;
   (4) it shows $[\alpha]_D^{22}=0°$ in pyridine, but its dihydro derivative shows specific rotations

$([\alpha]_{Hg}^{22})$: $[\alpha]_{436}^{22}=-2.2°$, $[\alpha]_{546}^{22}=-1.3°$, $[\alpha]_{578}^{22}=-1.5°$ (5) it is soluble in ethyl acetate, acetone, methanol, ethanol and pyridine and sparingly soluble in petroleum ether, ether, chloroform, benzene and acetonitrile;
   (6) it shows the following color reactions:

| | |
   |---|---|
   | Isonitrile reaction | — |
   | Dragendorff's reaction | + |
   | Ehrlich's reaction | + |
   | Legal's reaction | + |
   | Ferric hydroxamate reaction | ++ |
   | Fehling's reaction | — |
   | 2,4-dinitrohydrazone reaction | — |
   | Ferric chloride reaction | — |
   | Decoloration of potassium permanganate | + |

(7) it shows ultraviolet absorptions at the wave lengths in millimicrons of 224, 277, 288 and 295 (FIG. 1);
   (8) its crystals show significant infrared absorption bands in KBr disc at the wave numbers: 685, 755, 1025, 1130, 1440, 1480, 1665 and 1755 cm.$^{-1}$ (FIG. 2);
   (9) it gives hydrochloride ($C_{16}H_{16}O_2N_2 \cdot HCl$), colorless prisms, M.P. 225° C. (decomp.), elementary analytical values being C, 62.80%; H, 5.61%; N, 9.17%; Cl, 11.43%.

2. Rugulovasine B, characterized by the following properties:
   (1) it is a colorless resinous oily substance, hardly crystallized;
   (2) its molecular weight is about 268;
   (3) the elementary analytical values of its oxalate are C, 63.40%; H, 5.51% and N, 8.30%;
   (4) it shows $[\alpha]_D^{22}=0°$ in pyridine, but its dihydro derivative shows specific rotations $([\alpha]_{Hg}^{22})$: $[\alpha]_{435}^{22}=+2.3°$, $[\alpha]_{546}^{22}=+0.9°$, $[\alpha]_{578}^{22}=+0.5°$ (5) it is moderately soluble in ether, benzene and chloroform but sparingly soluble in petroleum ether;
   (6) it shows the same color reactions as rugulovasine A;
   (7) it shows ultraviolet absorptions at the wave lengths in millimicrons of 227, 278, 288 and 295;
   (8) the crystals of its oxalate show significant infrared absorption bands in KBr disc at the wave numbers: 685, 755, 1005, 1095, 1255, 1455, 1610, 1705, 1765, 2440, 2790, 3020 and 3290 cm.$^{-1}$ (FIG. 3);
   (9) it gives hydrochloride ($C_{16}H_{16}O_2N_2 \cdot HCl \cdot H_2O$), white prisms M.P. 187° C. (decomp.), elementary analytical values being C, 59.12%; H, 5.99%; N, 8.63%; Cl, 11.43%.

3. A method for producing rugulovasine A and B, which comprises incubating *Penicillium rugulosum* (ATCC 20201), *Penicillium concavo-rugulosum* (ATCC 20202), *Penicillium corylophiloides* (ATCC 20203), *Penicillium purpurogenum* (ATCC 20204), *Corticium caeruleum* (ATCC 20205), *Pellicularia filamentosa* (ATCC 20206), or *Lenzites trabea* (ATCC 20207) in a medium containing assimilable carbon sources, digestible nitrogen sources and other nutrients at about pH 4.0 to about pH 7.5 and at a temperature between about 20° and about 35° C. for about 10 to 20 days to accumulate rugulovasine A and B in the culture broth, and recovering the same therefrom.

4. A method according to claim 3, wherein the said microorganism is *Penicillium rugulosum* (ATCC 20201).

5. A method according to claim 3, wherein the said microorganism is *Penicillium concavo-rugulosum* (ATCC 20202).

6. A method according to claim 3, wherein the said microorganism is *Penicillium corylophiloides* (ATCC 20203).

7. A method according to claim 3, wherein the said microorganism is *Penicillium purpurogenum* (ATCC 20204).

8. A method according to claim 3, wherein the said microorganism is *Corticium caeruleum* (ATCC 20205).

9. A method according to claim 3, wherein the said microorganism is *Pellicularia filamentosa* (ATCC 20206).

10. A method according to claim 3, wherein the said microorganism is *Lenzites trabea* (ATCC 20207).

References Cited

Chemical Abstracts I 72: 30311f (1970).
Chemical Abstracts II 72: 43964w (1970).

JEROME D. GOLDBERG, Primary Examiner

U.S. Cl. X.R.
195—81